Oct. 25, 1932.  R. F. PEO  1,884,188
SHOCK ABSORBER
Filed April 3, 1931   3 Sheets-Sheet 1
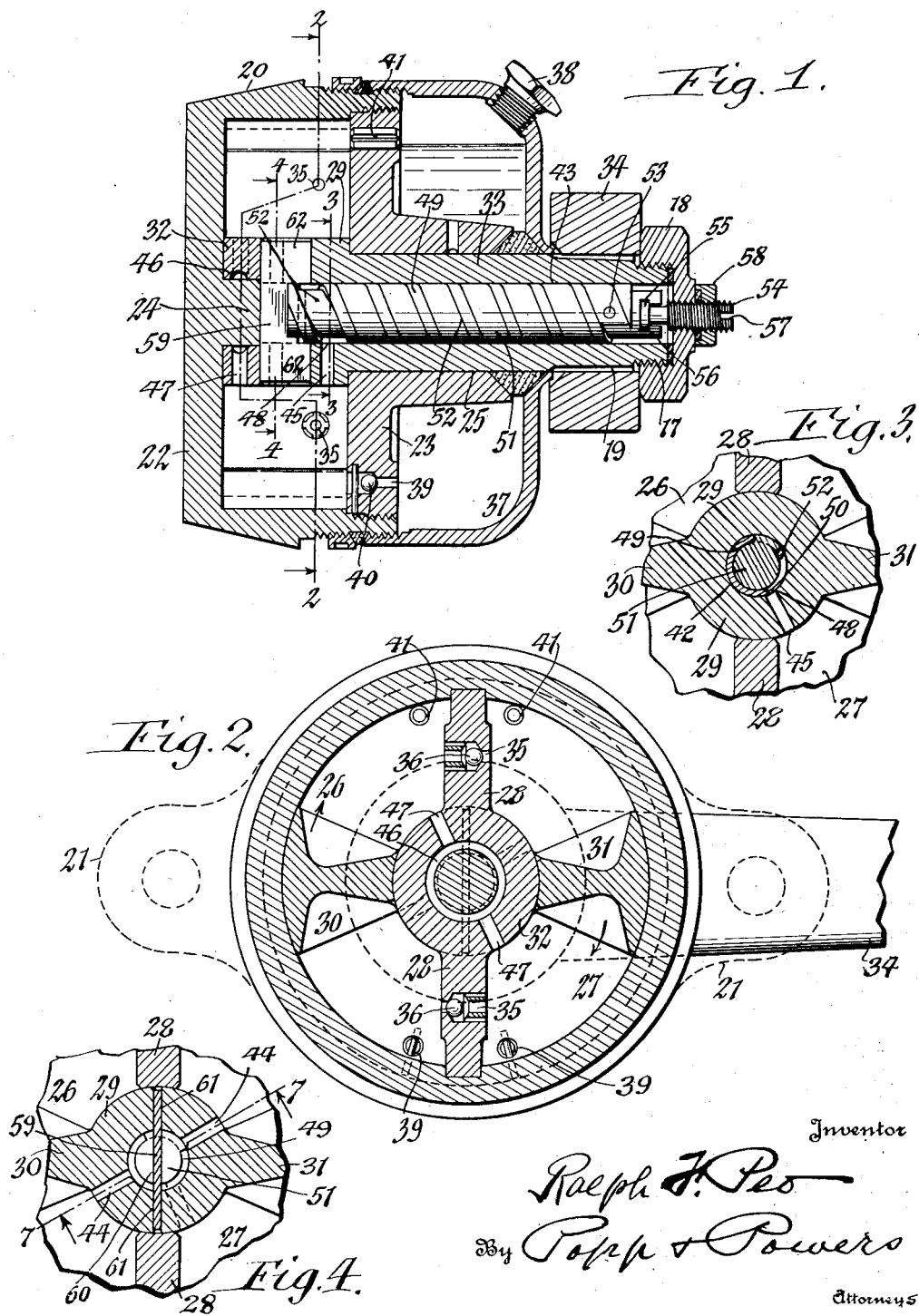

Oct. 25, 1932.    R. F. PEO    1,884,188
SHOCK ABSORBER
Filed April 3, 1931    3 Sheets-Sheet 2
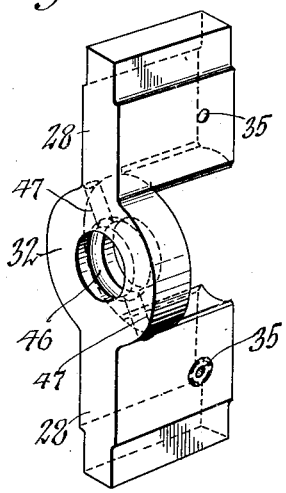
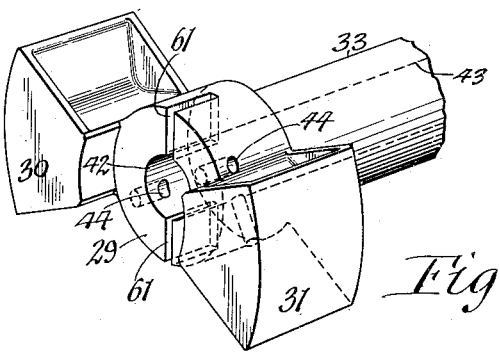
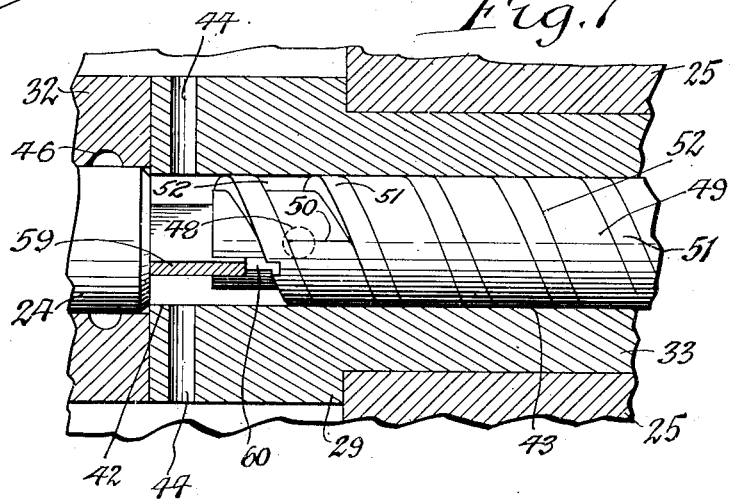
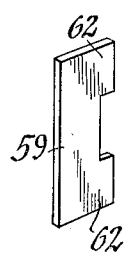
Inventor
Ralph F. Peo
By Popp & Powers
Attorneys

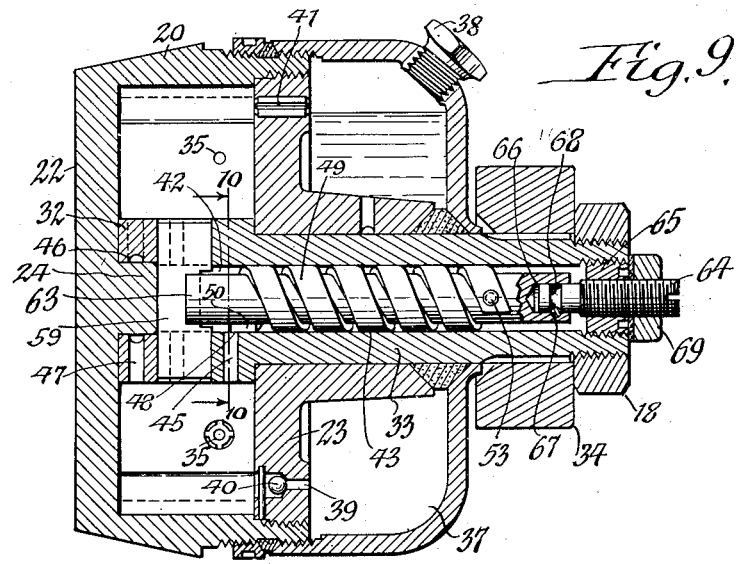

Patented Oct. 25, 1932

1,884,188

UNITED STATES PATENT OFFICE

RALPH F. PEO, OF BUFFALO, NEW YORK, ASSIGNOR TO HOUDE ENGINEERING CORPORATION, OF BUFFALO, NEW YORK, A CORPORATION OF NEW YORK

SHOCK ABSORBER

Application filed April 3, 1931. Serial No. 527,405.

This invention relates to a hydraulic shock absorber and more particularly to means which are responsive to temperature changes for varying the freedom of movement of the resistance liquid from one part to another of a working chamber in which the resistance liquid is shifted by means of a piston arranged therein, and thereby compensate for the difference in viscosity of the liquid which becomes thinner in warm weather and thicker in cold weather so that the shock absorber works uniformly under varying temperature conditions.

It is the object of this invention to provide improved thermostatic valve mechanism for controlling the flow of resistance liquid in accordance with the variations in temperature, which means are comparatively simple in construction, positive in operation, easy of assemblage and capable of being readily adjusted to suit different conditions under which the shock absorber is installed.

In the accompanying drawings:

Figure 1 is a vertical longitudinal section of a shock absorber embodying one form of this invention.

Figures 2, 3 and 4 are vertical transverse sections taken on the correspondingly numbered lines in Fig. 1.

Figure 5 is a perspective view of the partition whereby the space within the cylindrical body of the apparatus is divided into two semi-cylindrical working chambers.

Figure 6 is a similar view of the pistons and the hub and operating shaft associated therewith whereby the resistance liquid is displaced in the working chambers.

Figure 7 is a fragmentary longitudinal section, on an enlarged scale, taken on line 7—7, Fig. 4, looking upwardly.

Figure 8 is a perspective view of the key whereby the thermostatic core and the hub of the pistons and operating shaft are connected so as to compel these parts to turn together but permit the thermostatic core to move lengthwise independently of the operating shaft, hub and pistons.

Figure 9 is a vertical, longitudinal section of a shock absorber showing a modification of my improvement.

Figure 10 is a vertical section of the same taken on line 10—10, Fig. 9.

Figure 11 is a fragmentary longitudinal section showing a further modified form of the means whereby the thermostatic core is moved lengthwise of the operating shaft for the purpose of adapting the thermostatic control mechanism to meet different conditions or installations.

In the following description similar characters of reference indicate like parts in the several figures of the drawings.

Referring to Figs. 1–8, the numeral 20 represents the cylindrical wall of the shock absorber body which is adapted to be attached to one of the relatively movable members between which the shock is to be absorbed, for example, the frame of an automobile, in which case the body of the absorber is secured by means of bolts or similar fastenings passing through lugs 21 arranged on opposite sides of the cylindrical wall 20, as shown by dotted lines in Fig. 2. At its rear end the cylindrical wall 20 is provided with a transverse rear head 22 and at its front end this wall is provided with a transverse head 23. The rear head 22 is provided centrally with a forwardly projecting centering pin 24 and the front head 23 is provided with a forwardly projecting bearing 25.

The space between the cylindrical wall 20 and the front and rear heads 22 and 23 is divided into two working chambers 26, 27 by a diametrical partition consisting of upper and lower partition sections 28 which engage at their outer edges with the peripheral wall 20 and at their rear and front ends with the front and rear walls of heads 22, 23 while their inner ends are separated and receive between them the hub 29 of two pistons 30, 31 which oscillate in these working chambers. The rear portions of the partitions 28 are connected by a centering ring 32 into the bore of which the centering pin 24 projects, as shown in Figs. 1 and 2.

On its front side the hub 29 is connected with the rear end of an operating shaft 33 which latter is journaled in the bearing 25 and is provided at its front end with an operating arm or rock lever 34 which is adapted to be connected with the other one of the two relatively movable members between which the shock is to be absorbed, for example, an axle of an automobile which is connected with the frame of the same by means of a spring system and is supported by wheels. This arm may be connected with the front end of the operating shaft in any suitable and well known manner so as to compel these parts to turn together but this is preferably accomplished by a serrated joint 19 between the periphery of this shaft and the bore of the operating arm 34 and a clamping member 18 having preferably the form of a cap which is preferably connected by means of a screw joint 17 onto the front end of the shaft 33 and bears against the front side of the operating arm 34, as shown in Fig. 1.

During the high pressure stroke of the pistons which occurs when the body of the automobile and the axle thereof rebound from each other, the pistons move toward the high pressure ends of the working chambers which movement is indicated by the direction of the arrows associated with these pistons in Fig. 2, and during the low pressure stroke of the same which occurs when the axle and body of the automobile move toward each other, these pistons move in the opposite direction from that indicated by the arrows in Fig. 2.

Means are provided whereby the resistance liquid is capable of passing with comparative freedom from the low pressure end of each working chamber to the high pressure end of the other working chamber during the low pressure strokes of the pistons, but during the high pressure strokes of the same, movement of the liquid from the high pressure end of each working chamber to the low pressure end of the other working chamber is cut off, this being accomplished by means of a by-pass port 35 arranged in each of the partition sections 28, and check valves 36 each of which is arranged in one of the ports 35 and adapted to close toward the respective low pressure end of one of the working chambers and to open toward the high pressure end of the other working chamber, as shown in Fig. 2.

Liquid is supplied from time to time to the working chambers from a replenishing chamber 37 which is arranged in front of the working chambers and adapted to be filled as required through an opening in its top which is normally closed by a plug 38. The resistance liquid is delivered from this replenishing chamber into the working chambers preferably through one or more replenishing ports 39 connecting the lower ends of one or both of the working chambers with the lower part of the replenishing chamber and formed in the lower part of the front partition 23, and a check valve 40 arranged in each of these ports and adapted to close the same toward the replenishing chamber but to open toward the respective working chamber.

Air is permitted to escape from the upper ends of either one or both of the working chambers and into the upper part of the replenishing chamber by one or more vent passages 41 connecting the upper ends of one or both of the working chambers with the upper part of the replenishing chamber 37 and formed in the upper part of the front head 23, as shown in Figs. 1 and 2.

The hub of the pistons is provided with an axial longitudinal bore 42 and the operating shaft 33 is provided with an axial longitudinal bore 43 which bores 42 and 43 of the hub and operating shaft together form a valve chamber for the thermostatic controlling mechanism. In its rear part the hub of the pistons is provided with two low pressure controlling ports 44 extending from the bore portion 42 of the controlling valve chamber to the periphery of the hub 29 so as to open into the low pressure ends of the working chambers and in the front part of this hub the same is provided with a single high pressure controlling port 45 which extends from the bore portion 42 of the valve chamber in the hub to the periphery of the latter and opens into the high pressure end of one of the working chambers, in this case the high pressure end of the working chamber 27.

Means are provided for balancing the pressures between the high pressure ends of the working chambers, this being accomplished in the present instance by means of an annular groove 46 formed in the bore of the centering ring 32 and lateral balancing passages 47 extending from the groove 46 to the periphery of the ring 32 and opening into the high pressure ends of the respective working chambers, as shown in Figs. 1 and 2. The inner end of the port 45 which opens into the bore portion 42 of the controlling valve chamber forms a valve seat 48 which is adapted to be covered more or less by a thermostatic controlling valve which is responsive to variations in temperature and causes this controlling valve to be shifted relative to this port. This thermostatic controlling valve is preferably constructed in the form of a helical strip of metal 49 which is arranged within the controlling valve chamber and axially in line therewith so that the periphery of this valve strip engages with the bore of the valve chamber and the rear end 50 of this helical strip is arranged adjacent to the controlling valve seat 48 and the front end thereof is normally fixed. This helical valve strip is preferably constructed of a metal or other material which expands when subjected to an increase of temperature and contracts when exposed to a decrease in temperature, which movement of the controlling valve causes its rear end 50 to be moved more or less relative to the valve seat 48 and thereby cover the same more or less and thus vary the effective cross sectional area of the respective port. It follows from this that when the temperature of the instrument rises and the resistance liquid becomes thinner that the helical controlling valve will elongate and thereby shift the rear end of this controlling valve to a greater extent over the valve seat 48 of the controlling port 45 and thereby reduce the freedom of flow of resistance liquid from one part of each working chamber to the other, but the lowering of the temperature of the instrument will cause the helical controlling valve to contract lengthwise so that its rear end 50 will move away from the valve seat 48 and uncover the same to a greater extent and thereby increase the cross sectional area or capacity of the respective port accordingly and permit the resistance fluid which becomes thicker under the reduced temperature to flow more freely through the controlling passage from one end of each working chamber to the other thereby causing the shock absorber to operate uniformly under different temperature conditions.

This helical controlling valve may be supported in the controlling valve chamber in various ways for the purpose of accomplishing this result. It is preferably, however, to employ for this purpose a metal core 51 which is arranged lengthwise within the controlling chamber and engages the bore thereof and is provided in its periphery with a helical groove 52 in which the helical controlling valve 49 is fitted so as to be held against radial movement but is free to move in a helical direction with reference to the axis of the core and the controlling valve chamber. The rear end 50 of the controlling valve is free to move helically with reference to the axis of the supporting core so as to cover the valve seat 48 more or less, but the front end of this helical valve is secured to the front end of the core by means of a pin 53 as shown in Fig. 1 or any other suitable means.

The controlling valve is preferably constructed of aluminum or other suitable metal having a high rate of expansion and contraction under a varying temperature, such as brass or bronze, and the operating shaft 33 and its hub 29 and pistons 30 are constructed of steel or other metal or material having a co-efficient of expansion and contraction when subjected to varying temperatures which is less than the co-efficient of expansion and contraction of the helical controlling valve which is made of aluminum or similar metal or material.

For the purpose of enabling the controlling valve 49 to be adjusted to resistance liquids having different characteristics and also to suit the particular load which is to be imposed on the shock absorber or to meet other conditions of a particular installation, means are provided for moving the helical controlling valve and its supporting core bodily lengthwise in the valve chamber so that the rear end of the helical valve will occupy the required position relative to the valve seat 48 in order to obtain the required results. Suitable means for accomplishing this purpose consist of adjusting means for moving the core and helical valve lengthwise in the controlling valve chamber and also means for permitting the helical valve and its core to be moved lengthwise independently of the operating shaft and its hub but compel the same to turn together. The adjusting means shown in Fig. 1 are manually operated and comprise an adjusting screw 54 engaging with a threaded opening in the cap 18 and provided at its rear end with an enlargement or head 55 which engages with a T-shaped slot 56 extending crosswise of the front end of the regulating valve core, as shown in Fig. 1. Upon turning the screw 54 manually by means of a screw driver inserted in the nick 57 in the outer end of the screw 54 or by any other suitable means the valve core 51 will be moved lengthwise in the controlling valve chamber in one direction or the other with the helical controlling valve mounted thereon. After these parts have been shifted into the required position the same are held against accidental misplacement by means of a clamping nut 58 arranged on the outer end of the adjusting screw 54 and engaging with the front side of the screw cap or nut 18, as shown in Fig. 1.

For the purpose of preventing the controlling valve core from turning in the controlling valve chamber but permitting longitudinal movement of this core in the valve chamber, means are provided which in their preferred form consist of a flat key or retaining plate 59 which is mounted diametrically on the piston hub and the controlling valve core and has its central part engaging with a diametrical slot 60 in the rear end of the valve core 51 while its opposite ends engage with diametrical slots 61 formed in the rear end of the hub 29 of the pistons, as shown in Figs. 1 and 4. The central part of the key 59 is preferably somewhat narrower than the end portions 62 thereof so that these end portions overhang opposite sides of the valve core 51 more or less at all times and thereby prevent this key from moving transversely on the controlling valve core and getting out of place.

If desired the helical groove in the controlling valve core may be omitted in which case the valve core, as shown at 63 in Fig. 9, is of cylindrical form and of a diameter corresponding to the diameter of the bore of the helical controlling valve 49. In such a construction, however, the helical controlling valve is not guided in its helical movement while expanding and contracting lengthwise when subjected to different temperature conditions.

In Figs. 9 is shown a different form of means for adjusting the controlling valve core and the helical valve mounted thereon which means in this instance consist of an adjusting screw 64 working in a screw plug 65 secured in the outer end of the operating shaft 33 and having its rear end engaging with a socket 66 in the front end of the core 63, a tangential pin 67 secured to the core 63 and engaging with an annular groove 68 in the periphery of the rear part of the screw 64, and a clamping screw nut 69 mounted on the front end of the adjusting screw 64 and engaging with the front side of the bushing 65 and the shaft 33.

Another device for adjusting the controlling valve 49 and valve 63 lengthwise in the bore of the operating shaft 33 is shown in Fig. 11 which consists of a push screw 70 having threaded engagement with the cap 18 applied to the front end of the operating shaft 33 and bearing against the front end of the core 63, and a pull screw 71 turning in an opening 72 in the cap 18 and having its threaded inner end engaging with a threaded opening 73 in the core 63 and bearing with its head 74 against the outer side of the cap 18. By manipulating these screws 70 and 71 the helical controlling valve and the core upon which the same is mounted may be moved bodily either inwardly or outwardly lengthwise of the operating shaft and the piston hub for the purpose of bringing the rear end of the helical valve in the desired position relative to the valve seat 48 as may be necessary to suit liquids of different viscosity or different conditions of installation.

From the foregoing it will now appear that by means of this thermostatically controlled valve mechanism it is possible for some of the resistance liquid to pass into and out of the working chambers on opposite sides of the pistons therein both during the high pressure and low pressure strokes of the pistons so that the movement of the pistons will not encounter a dead liquid resistance but instead liquid will give way to some extent and therefore retard or cushion the movement of the pistons, and that the freedom of movement of the resistance liquid under these conditions is automatically varied in response to variations in temperature conditions so as to secure uniformity of action of the shock absorber; and the controlling valve mechanism is also capable of manual adjustment in order to set the instrument in accordance with the requirements of the particular use to which it is put.

As a whole this control valve mechanism is very simple in construction, the same can be very easily installed and adjusted to suit varying requirements and the same is not liable to get out of order by constant use.

I claim as my invention:

1. A hydraulic shock absorber having a body member provided with a working chamber adapted to contain a resistance liquid, a piston member movable back and forth in said chamber, one of said members having a passage communicating with said chamber on opposite sides of said piston, a relatively stationary core, and a helical thermostatic member surrounding said core and having one end secured thereto while its opposite end is slidable on said core and relative to said passage and thereby adapted to close the passage more or less under varying temperatures which expand and contract said thermostatic member.

2. A hydraulic shock absorber having a body member provided with a working chamber adapted to contain a resistance liquid, a piston member movable back and forth in said chamber, one of said members having a passage communicating with said chamber on opposite sides of said piston, a relatively stationary core having a helical peripheral groove, and a helical thermostatic member arranged in said groove and secured at one end to said core and adapted to move with its opposite end more or less across said passage due to lengthening or shortening of said thermostatic member in response to variations in temperature and thereby vary the capacity of said passage accordingly.

3. A hydraulic shock absorber having a body member provided with a working chamber adapted to contain a resistance liquid, a piston member movable back and forth in said chamber, one of said members having a passage communicating with said chamber on opposite sides of said piston, a helical thermostatic member which is adapted to expand and contract under variations in temperature and which is normally fixed at one end and adapted to slide at its opposite end more or less across said passage for varying the capacity thereof, and adjusting means for shifting the helical thermostatic element bodily relative to said passage.

4. A hydraulic shock absorber having a body member provided with a working chamber adapted to contain a resistance liquid, a piston member movable back and forth in said chamber, one of said members having a passage communicating with said chamber on opposite sides of said piston, a relatively stationary core, a helical thermostatic member surrounding said core and having one end secured thereto while its opposite end is movable helically thereon and relative to said passage and adapted to slide across the passage to close the same more or less under varying temperatures which expand and contract said thermostatic member, and means for adjusting said core lengthwise.

5. A hydraulic shock absorber having a body member provided with a working chamber adapted to contain a resistance liquid, a piston member movable back and forth in said chamber, one of said members having a passage communicating with said chamber on opposite sides of said piston, a relatively stationary core having a helical peripheral groove, a helical thermostatic member arranged in said groove and secured at one end to said core and adapted to move with its opposite end more or less across said passage due to lengthening or shortening of said thermostatic member in response to variations in temperature and thereby vary the capacity of said passage accordingly, and means for adjusting said core lengthwise together with the thermostatic member mounted thereon.

6. A hydraulic shock absorber comprising a body having a working chamber adapted to contain a resistance liquid, a piston oscillating in said chamber and having a hub, a rock shaft connected with said hub, said hub and shaft having an axial bore forming a valve chamber and said hub having a passage which communicates with said working chamber on opposite sides of said piston and is provided with a valve seat within said valve chamber, and a thermostatic valve member in the form of a helix arranged in said valve chamber and normally fixed at one end and adapted under varying temperature conditions to expand and contract to helically move its opposite end more or less across said valve seat for varying the capacity of said passage.

7. A hydraulic shock absorber comprising a body having a working chamber adapted to contain a resistance liquid, a piston oscillating in said chamber and having a hub, a rock shaft connected with said hub, said hub and shaft having an axial bore forming a valve chamber and said hub having a passage which communicates with said working chamber on opposite sides of said piston and is provided with a valve seat within said valve chamber, a thermostatic valve member in the form of a helix arranged in said valve chamber and normally fixed at one end and adapted under varying temperature conditions to expand and contract to helically move its opposite end more or less across said valve seat for varying the capacity of said passage, and means for adjusting said valve member bodily lengthwise in said valve chamber.

8. A hydraulic shock absorber comprising a body having a working chamber adapted to contain a resistance liquid, a piston oscillating in said chamber and having a hub, a rock shaft connected with said hub, said hub and shaft having an axial bore forming a valve chamber and said hub having a passage which communicates with said working chamber on opposite sides of said piston and is provided with a valve seat within said valve chamber, a helical thermostatic valve member in the form of a helix arranged in said valve chamber and normally fixed at one end and adapted under varying temperature conditions to expand and contract to helically move its opposite end more or less across said valve seat for varying the capacity of said passage, a core which is arranged lengthwise in said valve chamber and which supports said valve member and is secured to the same at its fixed end, and means for adjusting said core and valve member lengthwise in said valve chamber.

9. A hydraulic shock absorber comprising a body having a working chamber adapted to contain a resistance liquid, a piston oscillating in said chamber and having a hub, a rock shaft connected with said hub, said hub and shaft having an axial bore forming a valve chamber and said hub having a passage which communicates with said working chamber on opposite sides of said piston and is provided with a valve seat within said valve chamber, a thermostatic valve member in the form of a helix arranged in said valve chamber and normally fixed at one end and adapted under varying temperature conditions to expand and contract to helically move its opposite end more or less relative to said valve seat for varying the capacity of said passage, a core which is arranged lengthwise in said valve chamber and which supports said valve member and is secured to the same at its fixed end, and means for adjusting said core and valve member lengthwise in said valve chamber, including an adjusting screw having a screw connecting with said shaft and coupled with said core so as to turn independently thereof but move lengthwise therewith.

10. A hydraulic shock absorber comprising a body having a working chamber adapted to contain a resistance liquid, a piston oscillating in said chamber and having a hub, a rock shaft connected with said hub, said hub and shaft having an axial bore forming a valve chamber and said hub having a passage which communicates with said working chamber on opposite sides of said piston and is provided with a valve seat within said valve chamber, a thermostatic valve member in the form of a helix arranged in said valve chamber and normally fixed at one end and adapted under varying temperature conditions to expand and contract to helically move its opposite end more or less relative to said valve seat for varying the capacity of said passage, a core which is arranged lengthwise in said valve chamber and which supports said valve member and is secured to the same at its fixed end, means for adjusting said core and valve member lengthwise in said valve chamber, and means for compelling the core to turn with said hub and shaft but permitting the core to move lengthwise independently of said hub and shaft.

11. A hydraulic shock absorber comprising a body having a working chamber adapted to contain a resistance liquid, a piston oscillating in said chamber and having a hub, a rock shaft connected with said hub, said hub and shaft having an axial bore forming a valve chamber and said hub having a passage which communicates with said working chamber on opposite sides of said piston and is provided with a valve seat within said valve chamber, a helical thermostatic valve member arranged in said valve chamber and normally fixed at one end and adapted under varying temperature conditions to expand and contract and move its opposite end more or less relative to said valve seat for varying the capacity of said passage, a core which is arranged lengthwise in said valve chamber and which supports said valve member and is secured to the same at its fixed end, means for adjusting said core and valve member lengthwise in said valve chamber, and means for compelling the core to turn with said hub and shaft but permitting the core to move lengthwise independently of said hub and shaft, consisting of corresponding keyways formed in said hub and core and a key engaging with said keyways.

12. A hydraulic shock absorber comprising a body having a cylindrical wall, a rear head provided with a forwardly projecting centering pin, and a front head provided with a central bearing in line with said pin, a partition having radial sections arranged within said body on diametrically opposite sides thereof and dividing the same into two semi-cylindrical working chambers which are adapted to contain resistance liquid, a collar arranged on said pin and connecting the rear parts of said partition sections and having a liquid balancing conduit consisting of an annular groove in the bore of said collar and radial passages extending from said groove to the working chambers, respectively, pistons oscillating in said working chambers, a hub connecting the front parts of said partition sections, an operating shaft journaled in said bearing and connected with the front end of said hub, said hub and shaft having a longitudinal bore forming a valve chamber, said hub having rear ports leading from the rear part of said valve chamber to said working chambers and a front port leading from the valve chamber to one of said working chambers and forming a valve seat at its inner end, a core arranged in said valve chamber, a helical thermostat valve member surrounding said core and connected at its front end therewith and adapted to extend with its rear end more or less across said valve seat, a key engaging with said core and hub and compelling the same to turn together but permitting the core and valve member to move lengthwise independently of said hub and shaft, and an adjusting device interposed between said shaft and core for moving said core and valve lengthwise in said shaft and hub.

13. A hydraulic shock absorber comprising a body having a cylindrical wall, a rear head provided with a forwardly projecting centering pin, and a front head provided with a central bearing in line with said pin, a partition having radial sections arranged within said body on diametrically opposite sides thereof and dividing the same into two semi-cylindrical working chambers which are adapted to contain resistance liquid, a collar arranged on said pin and connecting the rear parts of said partition sections and having a liquid balancing conduit consisting of an annular groove in the bore of said collar and radial passages extending from said groove to the working chambers, respectively, pistons oscillating in said working chambers, a hub connecting the front parts of said partition sections, an operating shaft journaled in said bearing and connected with the front end of said hub, said hub and shaft having a longitudinal bore forming a valve chamber, said hub having rear ports leading from the rear part of said valve chamber to said working chambers and a front port leading from the valve chamber to one of said working chambers and forming a valve seat at its inner end, a core arranged in said valve chamber, a helical thermostat valve member surrounding said core and connected at its front end therewith and adapted to extend with its rear end more or less across said valve seat, a key engaging with said core and hub and compelling the same to turn together but permitting the core and valve member to move lengthwise independently of said hub and shaft, and an adjusting device interposed between said shaft and core for moving said core and valve lengthwise in said shaft and hub said helical valve member and said core being constructed, respectively, of materials having different co-efficients of expansion and contraction.

14. A hydraulic shock absorber comprising a body having a cylindrical wall, a rear head provided with a forwardly projecting centering pin, and a front head provided with a central bearing in line with said pin, a partition having radial sections arranged within said body on diametrically opposite sides thereof and dividing the same into two semi-cylindrical working chambers which are adapted to contain resistance liquid, a collar arranged on said pin and connecting the rear parts of said partition sections and having a liquid balancing conduit consisting of an annular groove in the bore of said collar and radial passages extending from said groove to the working chambers, respectively, pistons oscillating in said working chambers, a hub connecting the front parts of said partition sections, an operating shaft journaled in said bearing and connected with the front end of said hub, said hub and shaft having a longitudinal bore forming a valve chamber, said hub having rear ports leading from the rear part of said valve chamber to said working chambers and a front port leading from the valve chamber to one of said working chambers and forming a valve seat at its inner end, a core arranged in said valve chamber, a helical thermostat valve member surrounding said core and connected at its front end therewith and adapted to extend with its rear end more or less across said valve seat, a key engaging with said core and hub and compelling the same to turn together but permitting the core and valve member to move lengthwise independently of said hub and shaft, and an adjusting device interposed between said shaft and core for moving said core and valve lengthwise in said shaft and hub, said helical valve member being constructed of aluminum and said core being constructed of steel.

15. A hydraulic shock absorber having a body member provided with a working chamber adapted to contain a resistance liquid, a piston member movable back and forth in said chamber, means forming a valve chamber, there being a passageway connecting said valve chamber with said working chamber, a thermostat member in the form of a helix within said valve chamber having one of its ends rigidly secured and adapted for helical expansion and contraction under temperature changes, said passageway terminating in said valve chamber in the path of the free ends of said thermostat member whereby said member may close said passageway more or less when moved by the helical expansion and contraction of said member.

In testimony whereof I hereby affix my signature.

RALPH F. PEO.